US011923747B2

(12) United States Patent
Schmezer (10) Patent No.: US 11,923,747 B2
(45) Date of Patent: Mar. 5, 2024

(54) ELECTRIC MOTOR WITH OVERMOLDING CONNECTING ELECTRONICS AND/OR TERMINAL HOUSING AND STATOR TO EACH OTHER AND METHOD FOR PRODUCING AN ELECTRIC MOTOR

(71) Applicant: Ziehl-Abegg SE, Künzelsau (DE)

(72) Inventor: Joachim Schmezer, Niedernhall (DE)

(73) Assignee: Ziehl-Abegg SE, Künzelsau (DE)

( * ) Notice: Subject to any disclaimer, the term of this patent is extended or adjusted under 35 U.S.C. 154(b) by 595 days.

(21) Appl. No.: 16/967,737

(22) PCT Filed: Jan. 24, 2019

(86) PCT No.: PCT/EP2019/000020
§ 371 (c)(1),
(2) Date: Sep. 12, 2020

(87) PCT Pub. No.: WO2019/154556
PCT Pub. Date: Aug. 15, 2019

(65) Prior Publication Data
US 2021/0399606 A1     Dec. 23, 2021

(30) Foreign Application Priority Data
Feb. 6, 2018  (DE) .................... 10 2018 001 015.6

(51) Int. Cl.
*H02K 5/02* (2006.01)
*H02K 5/22* (2006.01)
*H02K 15/00* (2006.01)
*H02K 15/14* (2006.01)

(52) U.S. Cl.
CPC ............. *H02K 5/225* (2013.01); *H02K 5/02* (2013.01); *H02K 15/0062* (2013.01); *H02K 15/14* (2013.01)

(58) Field of Classification Search
CPC ....... H02K 1/187; H02K 1/2786–2789; H02K 1/2791; H02K 1/27915; H02K 1/2792;
(Continued)

(56) References Cited

U.S. PATENT DOCUMENTS

| 5,644,178 A | 7/1997 | Halm | |
| 2003/0173851 A1* | 9/2003 | Kudou | H02K 5/08 310/156.12 |

(Continued)

FOREIGN PATENT DOCUMENTS

| DE | 10 2009 013 363 | 9/2010 | |
| DE | 102013003052 A1 * | 9/2014 | .......... H02H 7/0852 |

(Continued)

OTHER PUBLICATIONS

Burkhardt, Machine Translation of DE102013003052, Sep. 2014 (Year: 2014).*

*Primary Examiner* — Eric Johnson
(74) *Attorney, Agent, or Firm* — Gudrun E. Huckett (57) ABSTRACT

The invention relates to an electric motor comprising a stator (A) with an insulation, a rotor, and an electronics and/or terminal housing (1) comprising a bottom (4), in which electrical/electronic components provided for the operation of the electric motor are housed. The electronics and/or terminal housing (1) is permanently connected to the stator (A) by means of an overmould (17b) so as to form a stator unit, the bottom (4) of the electronics and/or terminal housing (1) being at least partially covered by the overmould (17b) on its upper side. The overmould is not only provided for the stator, but is used at the same time as a connection means for connecting the electronics and/or terminal housing to the wound stator. Additional connection parts are not required as a result. The stator packet is first wound and then inserted into an injection mould with the electronics housing (1). Then, a heat-conductive, electrically insulating plastic is (Continued)

used to form the overmould (17b). Said overmould permanently connects the stator and the electronics and/or terminal housing (1) together to form the stator unit. As the bottom (4) of the electronics and/or terminal housing (1) is at least partially covered on the upper side by the overmould (17b), a secure interlocking connection is ensured between the electronics and/or terminal housing (1) and the stator (A).

14 Claims, 10 Drawing Sheets (58) Field of Classification Search
CPC .. H02K 5/02; H02K 5/04; H02K 5/08; H02K 5/10; H02K 5/22; H02K 5/225; H02K 11/30; H02K 11/33; H02K 15/10; H02K 15/105; H02K 15/12; H02K 15/14; H02K 15/125; H02K 15/0062; H02K 21/22; H02K 21/222
See application file for complete search history.

(56) References Cited

U.S. PATENT DOCUMENTS

| | | |
|---|---|---|
| 2004/0104628 A1* | 6/2004 | Streng .................. F04D 29/668 310/51 |
| 2004/0119345 A1 | 6/2004 | Takano |
| 2010/0019586 A1* | 1/2010 | Lu ............................ H02K 5/08 310/43 |
| 2010/0187920 A1 | 7/2010 | Best et al. |
| 2012/0299401 A1* | 11/2012 | Prucher .................. H02K 16/02 310/43 |
| 2015/0207379 A1 | 7/2015 | Müller et al. |

FOREIGN PATENT DOCUMENTS

| | | |
|---|---|---|
| DE | 10 2014 200 763 | 7/2015 |
| EP | 1 560 319 | 8/2005 |
| JP | H04295258 | 10/1992 |
| JP | 2004-201430 | 7/2004 |
| WO | 2004/008603 | 1/2004 |

* cited by examiner

ELECTRIC MOTOR WITH OVERMOLDING CONNECTING ELECTRONICS AND/OR TERMINAL HOUSING AND STATOR TO EACH OTHER AND METHOD FOR PRODUCING AN ELECTRIC MOTOR

BACKGROUND OF THE INVENTION

The invention concerns an electric motor with a stator with insulation, a rotor, and an electronics and/or terminal housing comprising a bottom, in which electrical/electronic components provided for operation of the electric motor are accommodated and which is fixedly connected by an overmolding with the stator to a stator unit, as well as a method for producing such an electric motor in which a stator is provided with an electrical insulation and is connected with an electronics and/or terminal housing.

Electric motors are known in which the stator, after winding, is overmolded with a thermoplastic or thermoset plastic material for forming an insulation and an electronics housing of aluminum is then screwed onto this overmolded stator. Nut threads are provided in the insulation by means of which the attachment in the electronics housing by means of fastening screws is realized by the customer. In case of larger motors, in particular in case of electric motors with larger size electronics that are heavier and can also carry heavier fan wheels due to their greater power, the screw connection in the insulation reaches its limits.

It is also known (DE 10 2014 200 763 A1) to overmold the stator of an electric motor with a potting compound which penetrates into openings in the bottom of an electronics housing and fills them. In this way, the stator is connected with the electronics housing by means of the potting compound.

The invention has the object to configure the electric motor of the aforementioned kind and the method of the aforementioned kind in such a way that a safe attachment of the electric motor is ensured with constructively simple configuration and manufacture.

SUMMARY OF THE INVENTION

This object is solved for the electric motor of the aforementioned kind in that, in accordance with the invention, the bottom of the electronics and/or terminal housing is at least partially covered at the top side by the overmolding, and for the method of the aforementioned kind in that, in accordance with the invention, the stator packet of the stator is wound and together with the electronics housing is placed into an injection molding tool and in that subsequently a heat-conducting, electrically insulating plastic material is introduced for forming the overmolding which connects the stator and the electronics and/or terminal housing fixedly to each other to a stator unit.

In the electric motor according to the invention, the electronics and/or terminal housing and the stator due to its overmolding are connected fixedly with each other to a stator unit. It forms a complete structural component so that the manufacture of the electric motor is possible in a simple way. The overmolding is thus not only provided for the stator but it serves at the same time also as a connecting means in order to connect the electronics and/or terminal housing with the wound stator. In this way, additional connecting parts between the electronics and/or terminal housing and the stator are saved. In this context, only a single overmolding process is required. The material of the overmolding enables an optimal heat dissipation from the winding region of the stator into the electronics and/or terminal housing. The bottom of the electronics and/or terminal housing is covered at least partially at the top side by the overmolding.

In this way, a safe form-locked connection between the electronics and/or terminal housing and the stator is ensured.

Advantageously, the overmolding connects the electronics and/or terminal housing with the stator in a form-locking manner. In this way, the electronics and/or terminal housing and the stator are reliably fixedly connected to each other so that an accidental detachment during assembly and also during the use of the electric motor is precluded.

A reliable fixed connection between the electronics and/or terminal housing and the stator is achieved in that the electronics and/or terminal housing is provided with openings for the passage of the material of the overmolding. The material passes through the openings so that it is located at both sides of the corresponding part of the electronics and/or terminal housing that is provided with the openings. The thus achieved form-locked connection is safe and is able to withstand even great loads.

It is particularly advantageous when the openings for the passage of the material of the overmolding are provided in the bottom of the electronics and/or terminal housing. In this way, this material can pass through the openings into the electronics and/or terminal housing and thus cover the bottom at both sides, for example, whereby a reliable form-locked connection between the electronics and/or terminal housing and the stator is ensured. At the same time, the openings in the bottom of the electronics and/or terminal housing can be utilized to bring connecting contacts from the stator into the interior of the electronics and/or terminal housing. The overmolding encloses then also these connecting contacts so that they are properly positioned for the connection to the electronics in the electronics and/or terminal housing, which facilitates the assembly of the electric motors significantly.

Other components, such as sensors, e.g., thermal sensors, Hall sensors and the like, can also be passed through the openings.

It is advantageous when the overmolding at least partially covers the bottom at the top side as well as the bottom side.

In an advantageous embodiment, the top side of the bottom of the electronics and/or terminal housing is embodied recessed relative to a circumferentially extending rim which adjoins a jacket of the electronics and/or terminal housing. The thus formed recess within the electronics and/or terminal housing can then serve as a receptacle for the material of the overmolding when it passes through the openings in the bottom into the electronics and/or terminal housing.

A reliable fixed connection between the electronics and/or terminal housing and the stator is achieved when the top side of the overmolding which covers the top side of the bottom is positioned in one plane with the top side of the circumferential rim. In this way, the receptacle of the electronics and/or terminal housing has a continuously flat bottom surface extending all the way to the jacket which facilitates mounting of the electronics in the electronics and/or terminal housing.

The rim which extends about the circumference of the jacket of the electronics and/or terminal housing can be embodied to be relatively narrow so that a sufficiently large volume formed by the recess is present for receiving the overmolding.

The electronics and/or terminal housing comprises preferably a fastening flange which is at least mostly not covered by the overmolding. At this fastening flange, openings for passage of fastening screws can be provided by means of which the electric motor can be fastened by the customer. Alternatively, the fastening flange can be provided with fastening threads for the fastening screws. The fastening flange extends preferably about the circumference of the electronics and/or terminal housing. A fastening flange is to be understood however also as an embodiment in which, for example, two or more flange parts that are positioned at a distance from each other are provided about the circumference of the electronics and/or terminal housing.

Preferably, the fastening flange is embodied as one piece together with the jacket of the electronics and/or terminal housing. Additional work in order to connect the jacket to the fastening flange is then eliminated.

Advantageously, the bottom is also embodied as one piece with the jacket of the electronics and/or terminal housing. In this way, the electronics and/or terminal housing can then be produced together with the fastening flange and the bottom by means of an injection molding process, advantageously from aluminum. As further materials for the electronics and/or terminal housing, other materials that have good heat-dissipating properties are also conceivable.

In order to ensure a reliable radial orientation of the electronics and/or terminal housing relative to the stator, the bottom of the electronics and/or terminal housing in an advantageous way is provided with a central opening whose rim is adjoined by a ring that projects in the direction toward the stator packet of the stator. This ring can be closed about the circumference but can also be comprised of a partial ring or of individual ring segments that are positioned at a distance from each other. The ring can interact with a stator bushing of the stator in order to radially align the electronics and/or terminal housing relative to the stator.

In an advantageous embodiment, the ring is surrounded by an electrically insulating intermediate insulating element.

However, in another advantageous embodiment, it is also possible to eliminate the intermediate insulating element and to have the overmolding extend all the way up to the ring instead.

In an advantageous embodiment, the ring is configured such that it comprises a bearing seat for a rotary bearing for a rotor shaft. By means of the ring, a very good heat dissipation is possible from this rotary bearing that is neighboring the electronics housing. In use of an electric motor, this rotary bearing is more thermally loaded in general than the other rotary bearing which is located remote from the electronics and/or terminal housing because the windings of the stator as well as the power electronics accommodated in the electronics and/or terminal housing are lying in direct neighborhood to this rotary bearing.

In the method according to the invention, the stator packet of the stator is wound and then positioned in an injection molding tool together with the electronics and/or terminal housing. Subsequently, a heat-conducting, electrically insulating plastic material is introduced into the injection molding tool. In doing so, the stator is overmolded and at the same time the stator is connected to the electronic and/or terminal housing to the stator unit. In this way, a one-piece complete stator is created that does not require any further processing.

The subject matter of the application not only results from the subject matter of the individual claims but also from all specifications and features disclosed in the drawings and the description. They are, even if they are not subject matter of the claims, claimed as being important to the invention as far as, individually or in combination, they are novel relative to the prior art.

Further features of the invention result from the additional claims, the description, and the drawings.

BRIEF DESCRIPTION OF THE DRAWINGS

The invention will be explained in the following with the aid of some embodiments illustrated in the drawings in more detail. It is shown in.

DESCRIPTION OF PREFERRED EMBODIMENTS

In the embodiment, the motor is an EC motor with an electronics housing 1 which accommodates the required electrical/electronic components for operation of the EC motor. At the end which is facing the stator packet 2, the electronics housing 1 is provided with a radially outwardly projecting, circumferentially extending fastening flange 3. It serves for fastening the electric motor by the customer.

The housing 1 can also be, for example, a terminal housing or terminal box for an asynchronous or reluctance motor. For reason of simplicity, only an electronics housing is spoken of in the following.

The electronics housing 1 has a bottom 4 (FIGS. 1 to 5) provided with a central opening 5.

The bottom 4 is surrounded by a circumferentially extending raised rim 6 (FIGS. 3 and 4) from which a circumferential jacket 7 projects transversely.

In the recessed bottom 4, openings 8 are provided, distributed about the circumference, which serve for joining a complete overmolding of the stator packet 2 to still be described. In addition, additional openings 9 for passing through contacts are provided in the bottom 4. These openings 9 have an elongate contour, only as an example. The openings 8 also must not have the illustrated circular contour.

A ring 10 adjoining the rim of the central opening 5 extends perpendicularly away from the bottom side of the bottom 4 and extends only across a portion of the circumference of the opening 5.

At least the jacket 7 and the fastening flange 3 are produced as one piece from a metallic material, preferably from aluminum. Advantageously, also the bottom 4 of the electronics housing 1 is embodied as one piece together with the jacket 7.

The fastening flange 3 comprises, distributed about its circumference, passages 11 for fastening screws in order to fasten the electric motor by the client. Since the fastening flange 3 is comprised of metal and is embodied as one piece together with the jacket 7 of the electronics housing 1, a reliable screw connection of the EC motor is ensured. The fastening flange 3 can carry the weight of the electric motor as well as of the suspended fan in a reliable fashion without having to fear loosening of the screw connection.

Figure 1:
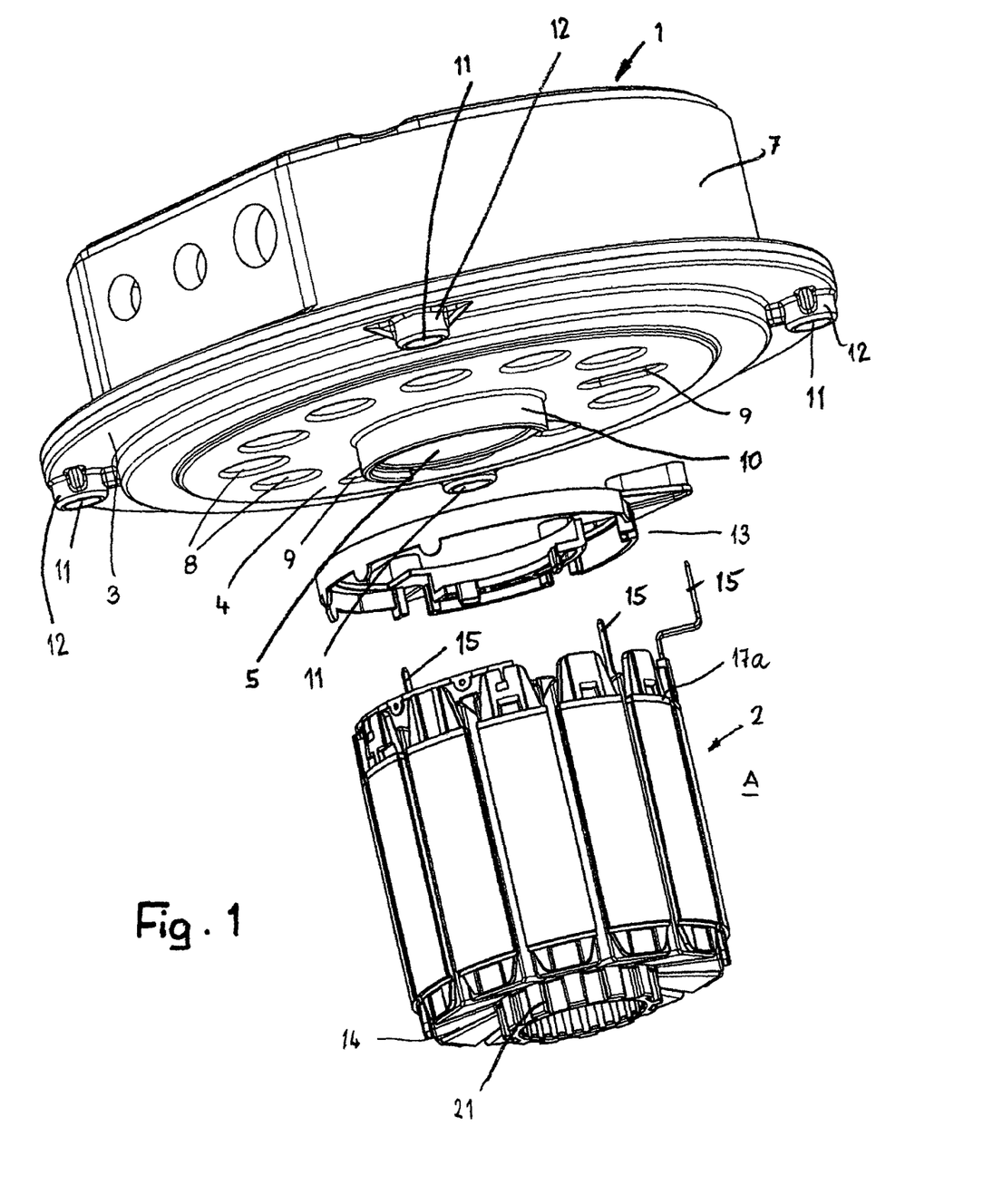
FIG. 1 in exploded illustration an electronics housing, an intermediate insulating element, and a stator of an EC motor according to the invention.

The passages 11, as illustrated in an exemplary fashion in FIG. 1, are surrounded at the bottom side of the fastening flange 3 facing away from the jacket 7 by a projecting ring 12 so that screws that are pushed through the passages 11 find a safe hold.

Instead of the passages, the fastening flange 3 can also be provided with threads for screwing in the fastening screws.

Since the electronics housing 1 is advantageously comprised completely of metal, a reliable dissipation of the heat produced when using the EC motor is provided. Therefore, the electronics housing 1 not only can be comprised of the preferred aluminum but also other heat-dissipating metallic materials.

The ring 10 which is projecting away from the bottom 4 in the direction toward the stator packet 2 is advantageously also embodied as one piece together with the bottom 4. The ring 10 is surrounded by an intermediate insulating element 13 that is comprised of an electrically insulating plastic material. It is matched in regard to its shape to the configuration of the stator packet 2 and can be embodied, for example, as a ring or as a ring segment.

In the illustrated embodiment, the intermediate insulating element 13 is of an annular embodiment.

Figure 2:
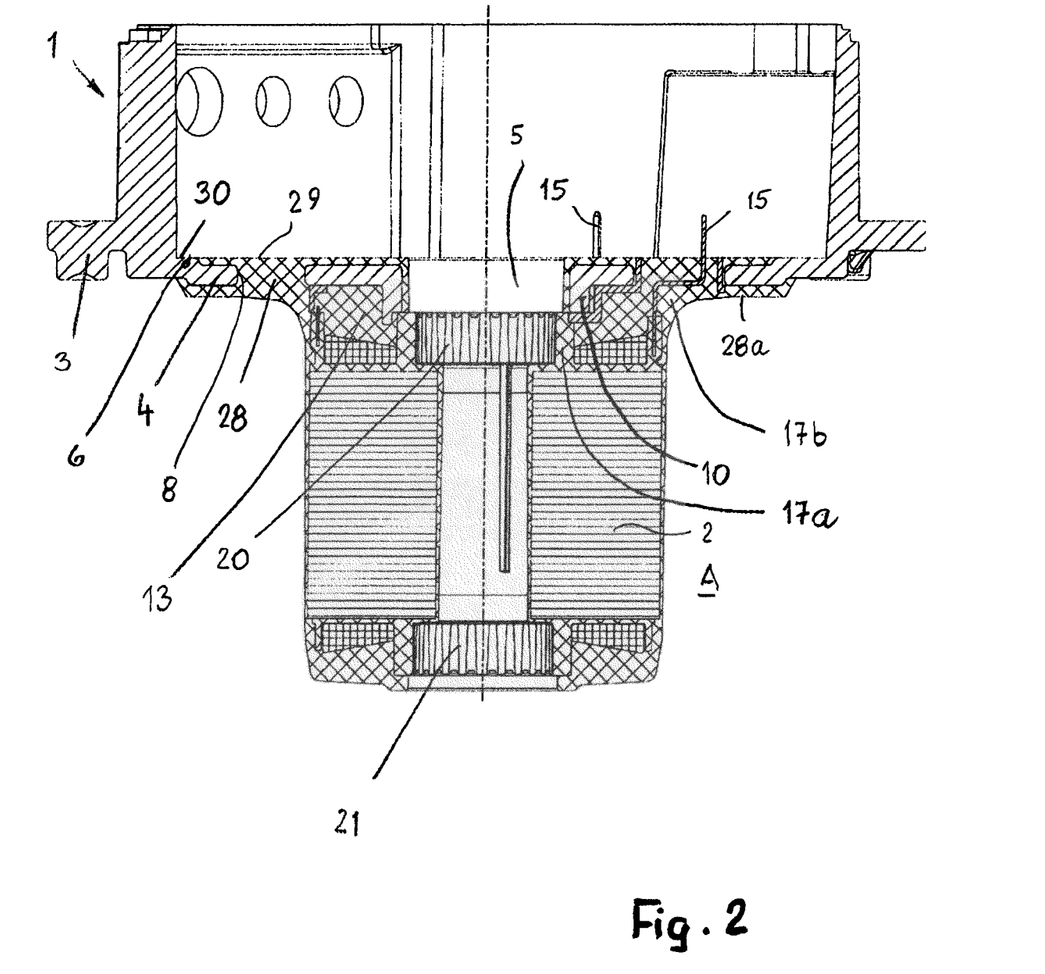
FIG. 2 an axial section through the parts connected to each other according to FIG. 1.

As shown in FIG. 2, the annular intermediate insulating element 13 is resting against the outer side of the ring 10 as well as against the bottom side of the bottom 4.

The stator packet 2 is formed, in a known manner, from sheet metal laminations stacked on each other and fixedly connected to each other in a suitable manner. The stator packet 2, in a known manner, is provided with a winding 14. The connecting contacts 15 of the winding 14 project through the openings 9 in the bottom 4 of the electronics housing 1 and are electrically connected to electronics 16 (FIG. 3) accommodated in the electronics housing 1.

The stator packet 2 is surrounded by an inner overmolding 17a that is comprised of an electrically insulating plastic material. It serves for insulating the stator packet 2 relative to the winding 14 and can be comprised, for example, of a thermoplastic material such as polyamide or PET. Provisions for receiving contacts can be provided in the inner overmolding 17a.

A rotor shaft 19 (FIG. 3) projects through the stator packet 2 and is supported in two rotary bearings 22, 23 which are accommodated in a bearing seat 20, 21, respectively. The bearing seats 20, 21 are located in the region above and below the stator packet 2 and are formed by the inner overmolding 17a. The rotary bearings 22, 23, as illustrated, can be a ball bearing. Depending on the configuration of the EC motor, the rotary bearing 22, 23 can also be embodied as a different rolling bearing or also as a slide bearing.

The rotor shaft 19 projects past the bearing seat 21 and supports at its end advantageously a cooling wheel 24 which is seated fixedly on the rotor shaft 19 and serves for cooling the EC motor.

The rotor shaft 19 supports in a known manner a rotor hood 25 which surrounds the stator packet 2 and comprises at its inner wall permanent magnets 26 which are distributed about the circumference of the rotor hood 25. The permanent magnets 26 surround the stator packet 2 with formation of an annular air gap 27. The permanent magnets 26 project with both ends axially past the stator packet 2. The rotor hood 26, in turn, projects axially past the permanent magnets 26 at their end facing the fastening flange 3.

For producing the stator A, the metallic electronics housing 1 with the fastening flange 3 and the wound stator packet 2 are inserted into an injection molding tool into which an electrically insulating plastic material 28 that has good heat conducting properties is injected which forms an outer overmolding 17b. Such a plastic material is advantageously a thermoset plastic material, for example, BMC (bulk molding compound). This is a fiber matrix semifinished product. It is comprised in most cases of short glass fibers and a polyester or vinyl ester resin. Thermoplastic materials are possible also. The plastic material forms the outer stator overmolding 17b. At the same time, a fixed connection between the electronics housing 1 and the stator A is realized by means of this injected plastic material. This is achieved in that the plastic material passes through the openings 8, 9 (FIGS. 1 to 5) in the bottom 4 of the electronics housing 1 and in this way generates a form-locked connection between the electronics housing 1 and the stator A. The bottom 4 of the electronics housing 1 is covered by the plastic material 28 such that the top side 29 of the overmolding 17b and the top side 30 of the rim 6 of the bottom 4 are positioned in a common plane (FIG. 2). Also, the bottom 4 is completely covered at its bottom side by the plastic material 28 which also encloses the exterior side of the stator packet 2 and the lower winding overhang of the stator packet 2.

The intermediate insulating element 13 which is seated on the ring 10 and is resting against the bottom side of the bottom 4 is also enclosed by the plastic material 28 and is joined in the compound assembly of electronics housing 1 and stator A. The connecting contacts 15 which project through the openings 9 in the bottom 4 into the interior of the electronics housing 1 are also held by the plastic material 28.

After the overmolding process, a complete stator unit with electronics housing 1 is produced as one piece. The fastening flange 3 is not covered by the overmolding 17a, 17b.

In principle, it is also possible to provide the fastening flange 3 at the bottom side with the overmolding 17b.

In principle, it is also possible to line parts of the interior region of the electronics housing 1 with the outer overmolding 17b so that an electrically insulating layer is produced at the inner wall of the electronics housing.

After connecting the electronics housing 1 with the stator A by means of the overmolding 17b, the electronics 16 are installed in the electronics housing 1. The electrical/electronic components are seated on at least one circuit board 31 (FIG. 3) which is fastened in a suitable way. Between the circuit board 31 and the bottom 4 of the electronics housing 1, an intermediate insulation 32 is provided which, for example, is embodied as a flat insulating disc and fastened in a suitable way in the electronics housing 1.

The intermediate insulation 32 can be omitted when the insulation is formed by the outer overmolding 17b.

At the end face of the jacket 7 of the electronics housing 1, a cover 33 is attached that is connected by screws detachably to the jacket 7.

Within the electronics housing 1, for example, two flat support elements 34, 35 are arranged (FIG. 4) that each extend at a slant to the inner wall of the jacket 7 and are connected to the jacket 7 with their ends lying in circumferential direction. Between the jacket 7 and the support elements 34, 35 receptacles 36 are formed into which fastening/clamping elements can be inserted that push the components against the support elements 34, 35 of the jacket 7. Due to the contact between these components and the jacket 7, the heat produced in these components in operation of the EC motor is dissipated via the jacket 7.

The jacket 7 comprises a straight section 37 in which through openings 38 for power lines are located which are connected to corresponding connectors within the electronics housing 1. The jacket 7 extends substantially cylindrically in other respects. Only in the region of the threaded bores 39, the jacket 7 is provided with inwardly extending part-circular recesses. Screws for attaching the cover 33 are screwed into the threaded bores 39. Advantageously, the jacket 7 in the region of the threaded bores 39 is made thicker so that the cover 33 can be screwed reliably to the end face of the jacket 7.

Figure 3:
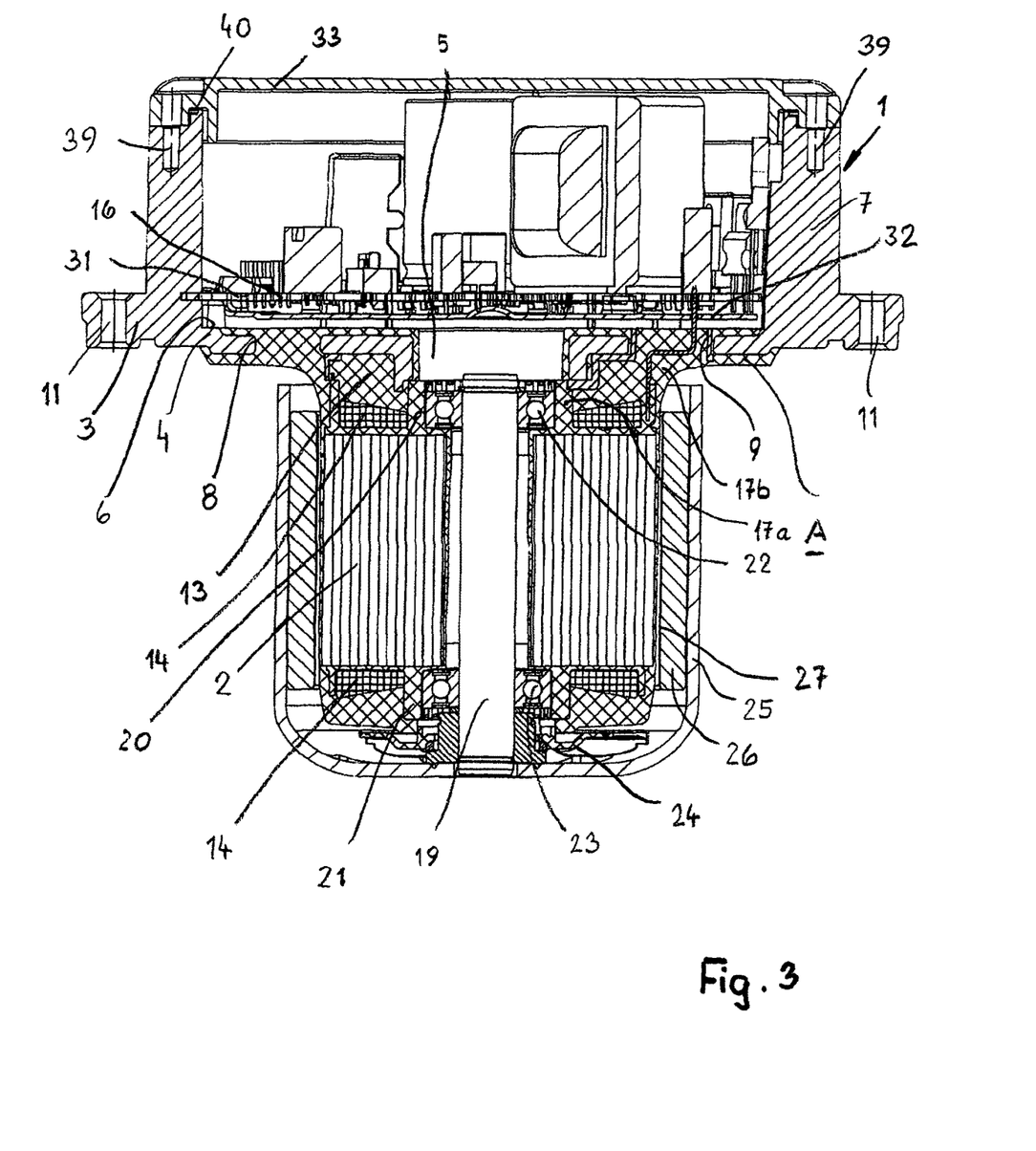
FIG. 3 an axial section through the EC motor according to the invention.
Figure 4:
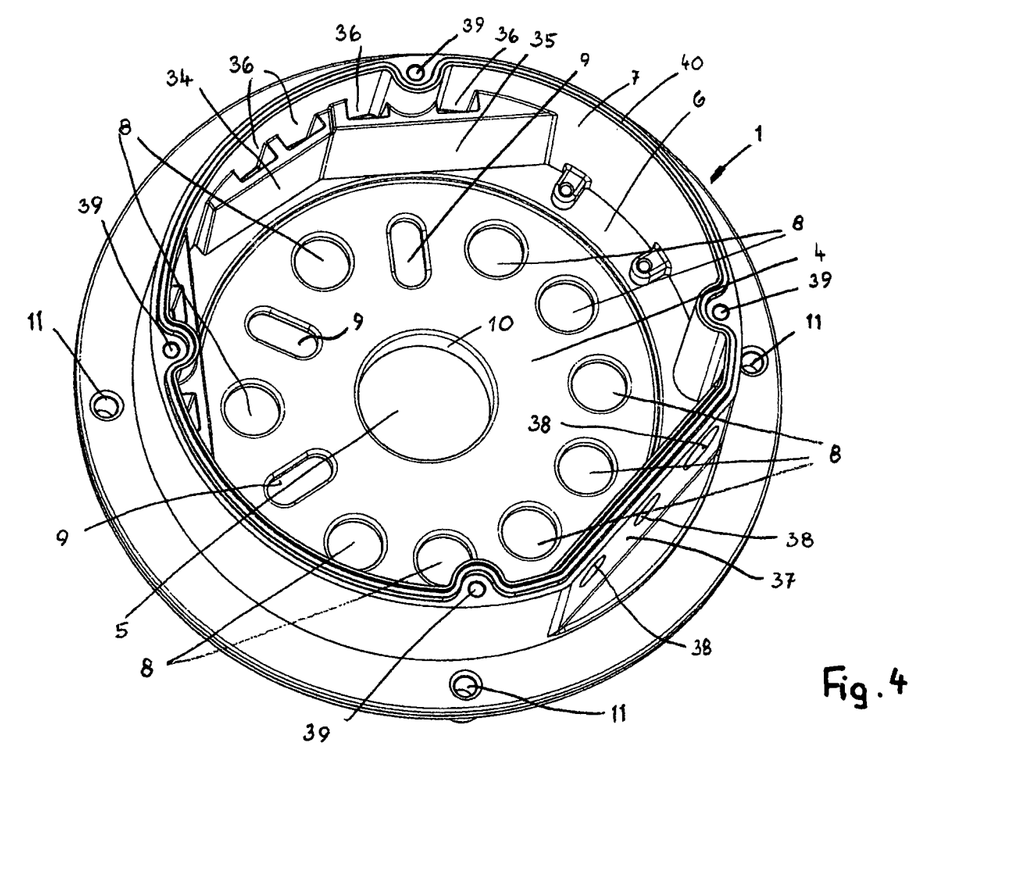
FIG. 4 in an enlarged and perspective illustration the electronics housing of the EC motor according to the invention.
Figure 5:
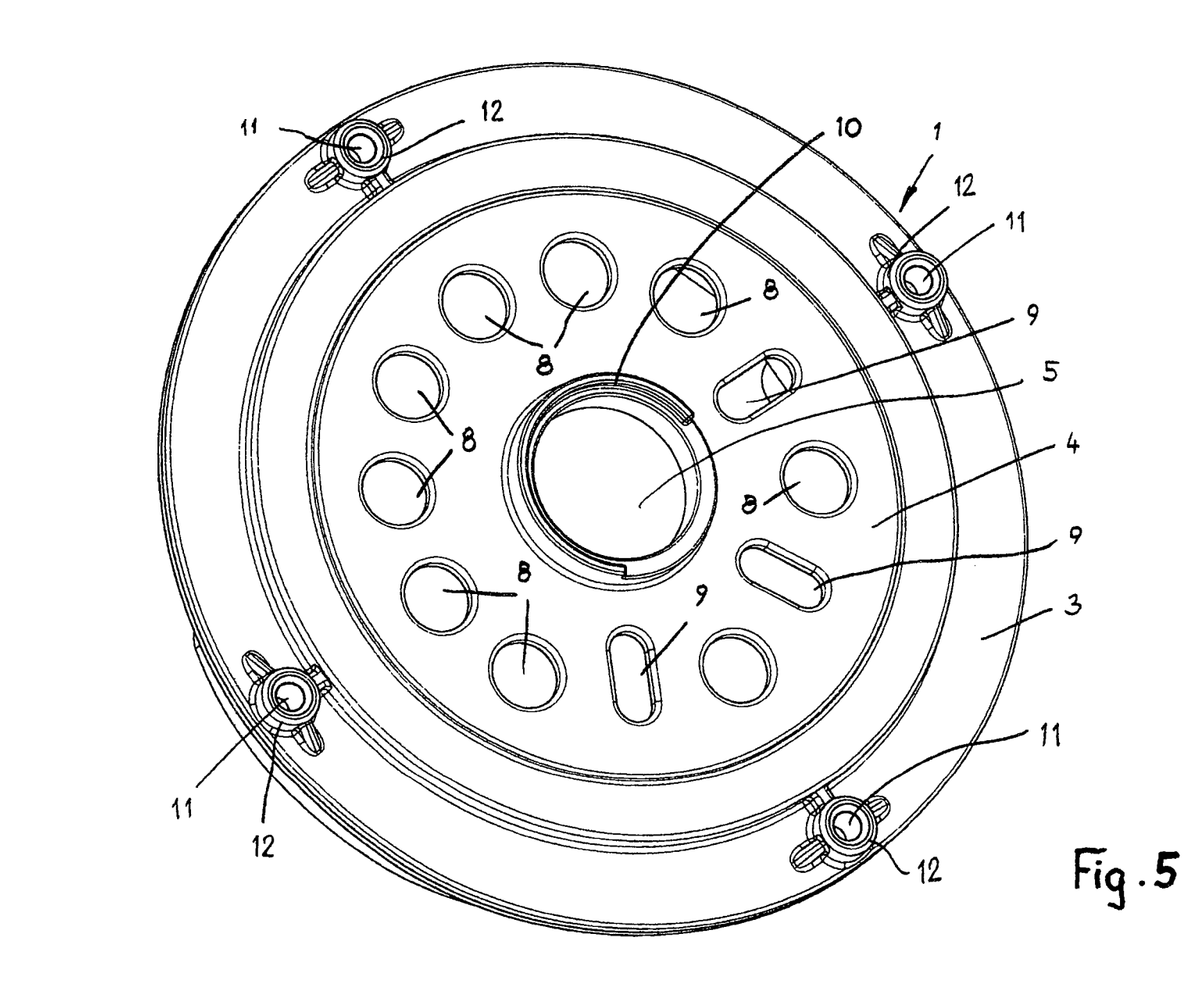
FIG. 5 the electronics housing according to FIG. 4 in a perspective bottom view.

At the end face of the jacket 7, advantageously a sealing surface 40 is provided which extends about the circumference of the jacket 7 and ensures the sealing action between the cover 33 (inclusive a seal) and the jacket 7 (FIGS. 3 and 4).

The fixed, preferably one-piece, connection between the jacket 7 of the electronics housing 1 and the fastening flange 3 has the advantage that the screw connection for the customer-side fan attachment is reliable, in particular also for heavy ventilators. The outer overmolding 17b enables a large-surface mechanical connection of the electronics housing 1 to the stator A. When the electronics housing 1 or its jacket 7 are formed in a preferred way as one piece together with the fastening flange 3, only a single component is required for this purpose, preferably a pressure die casting of aluminum. Only one overmolding process in the described way is required in order to completely overmold the stator A and at the same time produce the fixed form-locked connection between the stator A and the electronics housing 1. The overmolding 17b has moreover the advantage that an additional sealing action between the bottom 4 of the electronics housing 1 and the motor flange 28a (FIG. 2) formed by the overmolding 17b is not required.

Due to the large-surface thermal joining of the overmolding 17b to the bottom 4 of the electronics housing 1, an improved heat dissipation from the region of the winding 14 of the stator A is also provided. In the same way, an improved heat dissipation from the stator-side rotary bearing 22 and the electronics is ensured via the overmolding 17b to the bottom 4 of the electronics housing.

Since the electronics housing 1 is connected with the stator A with each other in the described way by the overmolding 17b, the electronics 16 as well as the power semiconductors can be mounted in a simple way.

The material of the overmolding 17b enables also an improved decoupling of the stator A from the electronics housing 1 with regard to noise and vibrations. The material of the overmolding 17b serves as a corresponding damping mass.

The connection between stator A and electronics housing 1 by means of the overmolding 17b provides the advantage that a mechanical processing at the electronics housing is not required. Only the threads in the bores 39 and optionally in the passages 11 must be provided.

The connection between the electronics housing 1 and the stator A requires no additional connecting parts so that mounting of the EC motor can be performed in a simple way.

A contribution to an improved cooling action of the EC motor is advantageously made when cooling ribs are provided at the bottom side of the fastening flange 3. They can extend radially but also at a slant to the circumferential direction of the annular fastening flange 3.

Figure 6:
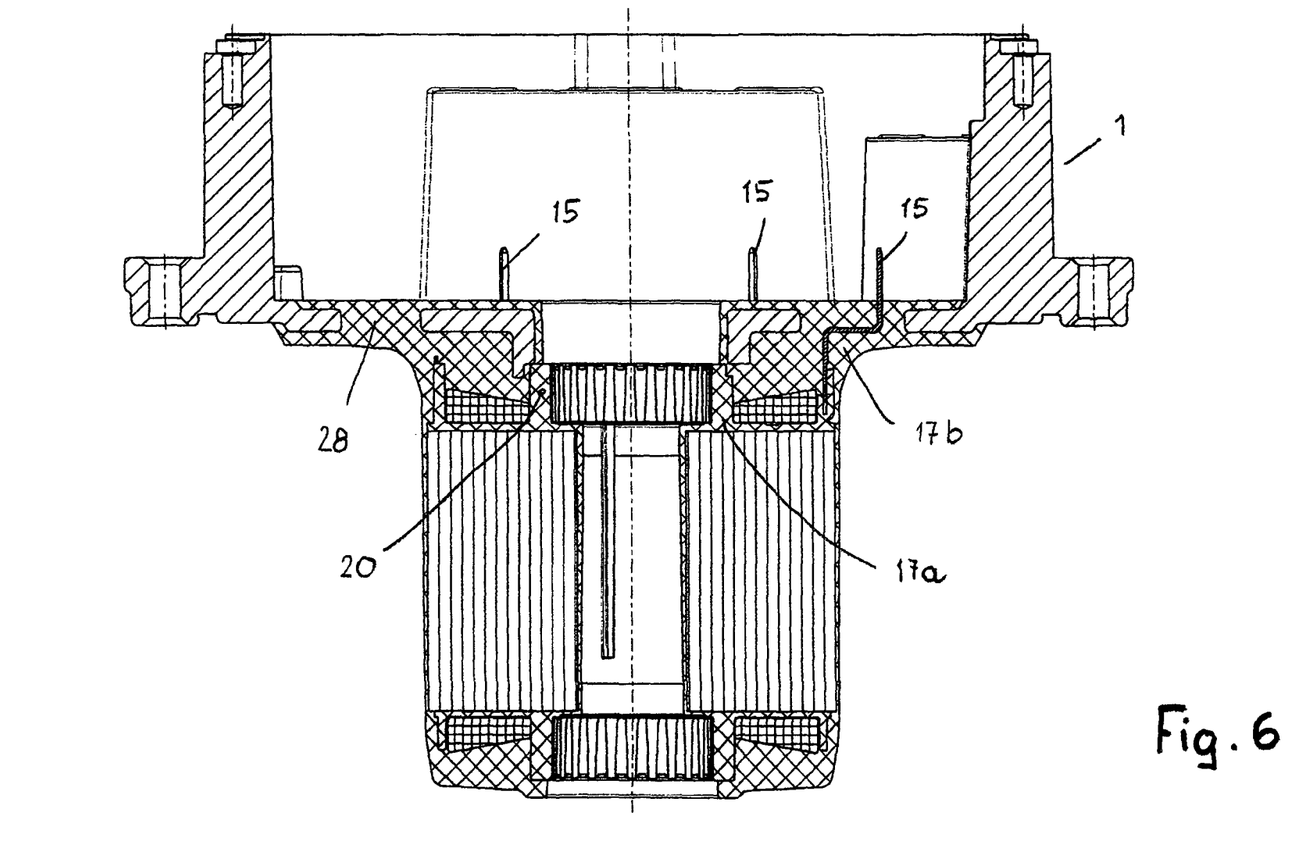
FIG. 6 in axial section an electronics housing connected to a stator in a second embodiment of an EC motor according to the invention.

FIG. 6 shows an embodiment that differs from the preceding embodiment in that an intermediate insulation element is not provided. In this case, the overmolding 17b encloses the bearing seat 20. The intermediate insulation element can then be omitted when it is ensured that minimum clearance and creepage distances between the contacts 15 and the electronics housing 1 can be maintained. In other respects, this embodiment is of the same configuration as the preceding embodiment. Here also the same advantages result which have been discussed in relation to the embodiment according to FIGS. 1 to 5.

Figure 7:
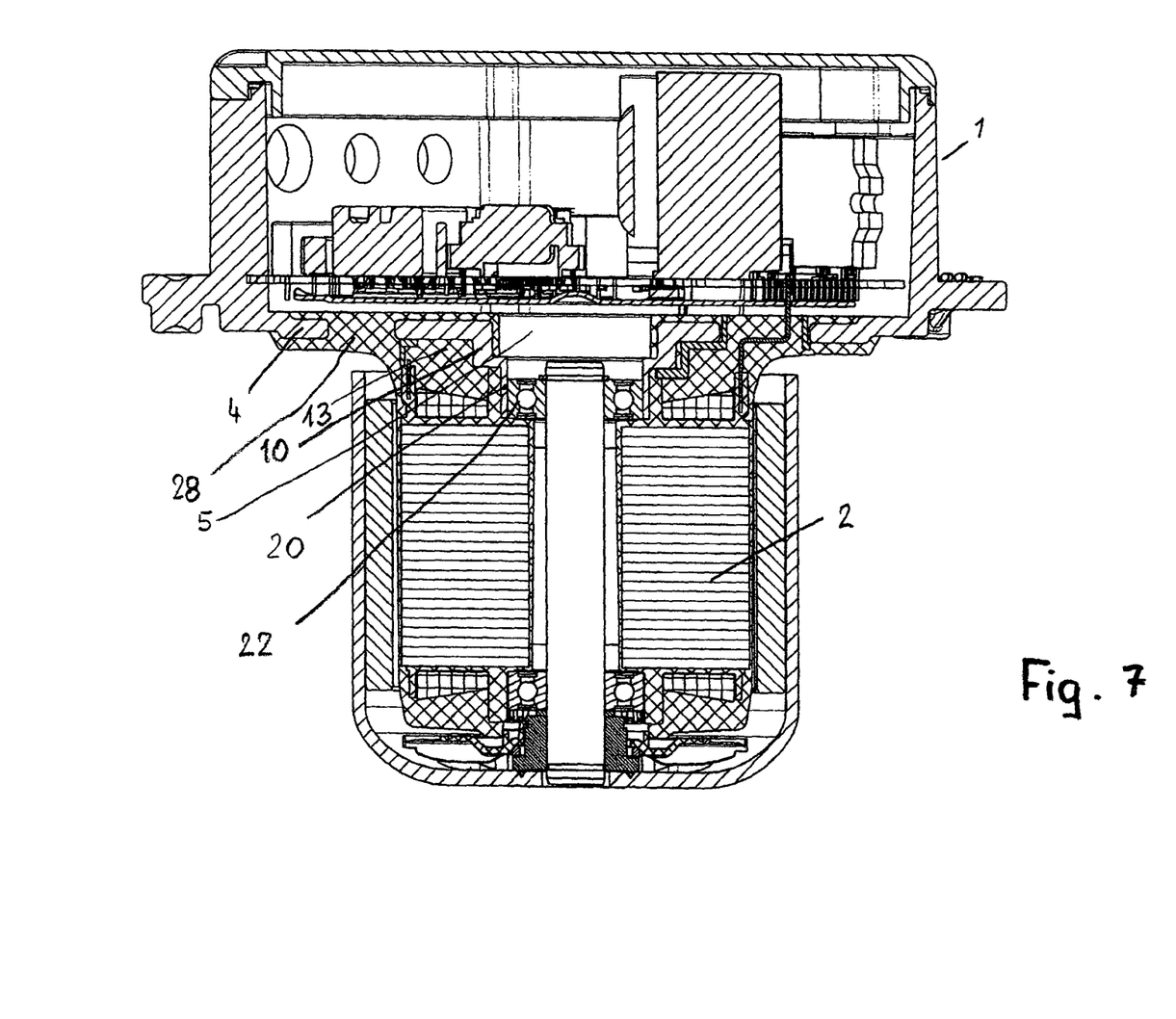
FIG. 7 in axial section a third embodiment of an EC motor according to the invention.
Figure 8:
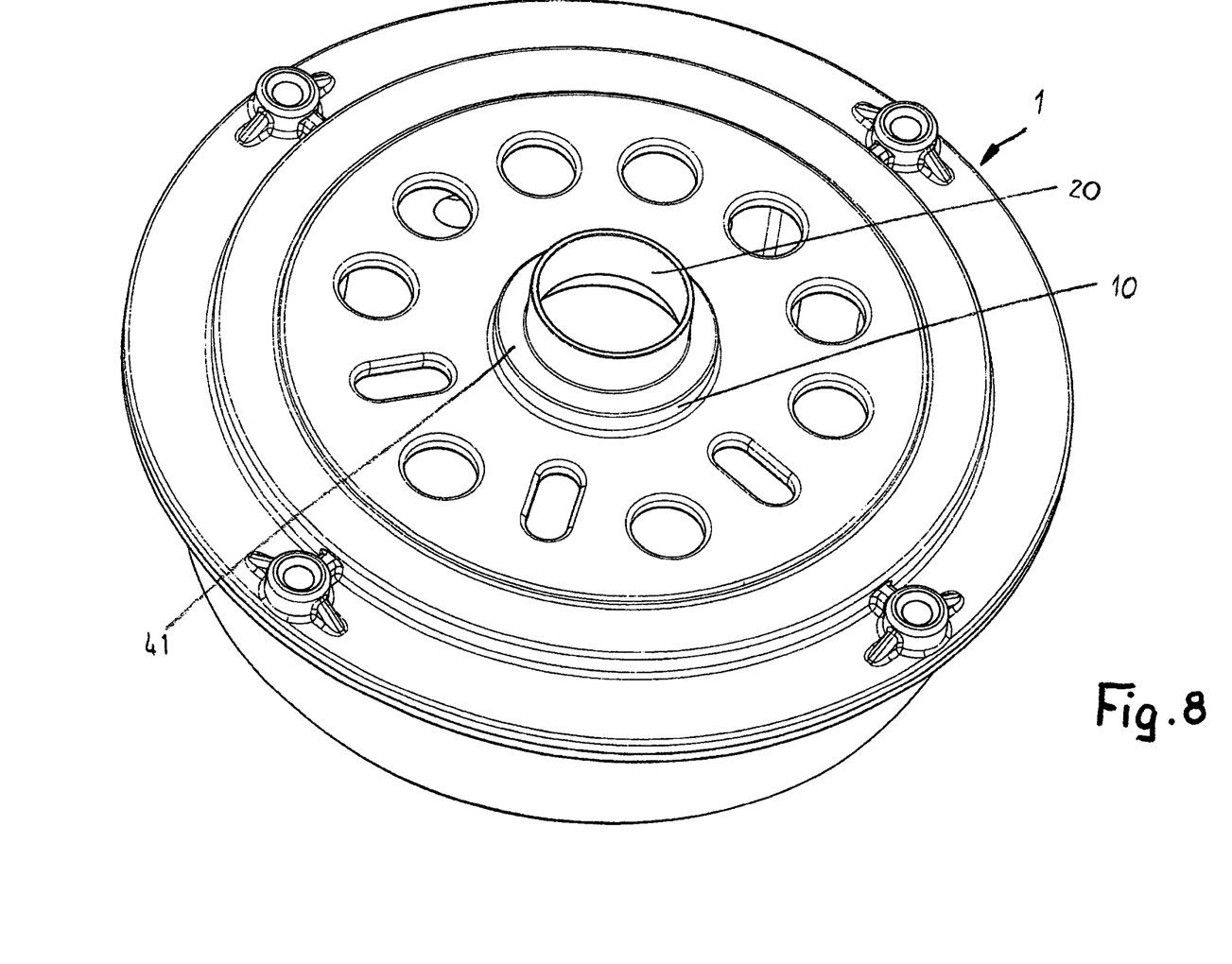
FIG. 8 in a perspective bottom view an electronics housing of the EC motor according to FIG. 7.

The embodiment according to FIGS. 7 and 8 corresponds substantially to the embodiment according to FIGS. 1 to 5. The difference resides in that the bearing seat 20 for the rotary bearing 22 facing the electronics housing 1 is part of the ring 10 that surrounds the central opening 5 in the bottom 4 of the electronics housing. The free rim of the ring 10 is angled for forming the bearing seat 20 so that an annular support surface 41 is formed (FIG. 8). It serves as an axial stop for the overmolding 17b. The bearing seat 21 is formed by the inner overmolding 17a.

Since in contrast to the preceding embodiments, the ring 10 in this embodiment is extended for forming the bearing seat 20, an improved heat dissipation from the rotary bearing 22 via the ring 10 into the electronics housing 1 is provided.

In operation, the rotary bearing 22 is thermally more strongly loaded than the rotary bearing 23 because the winding 14 and the power electronics 16 are positioned neighboring the rotary bearing 22. The heat can be dissipated optimally via the bearing seat 20 of the ring 10 into the electronics housing 1.

In other respects, the embodiment according to FIGS. 7 and 8 is of the same configuration as the embodiment of FIGS. 1 through 5.

Figure 9:
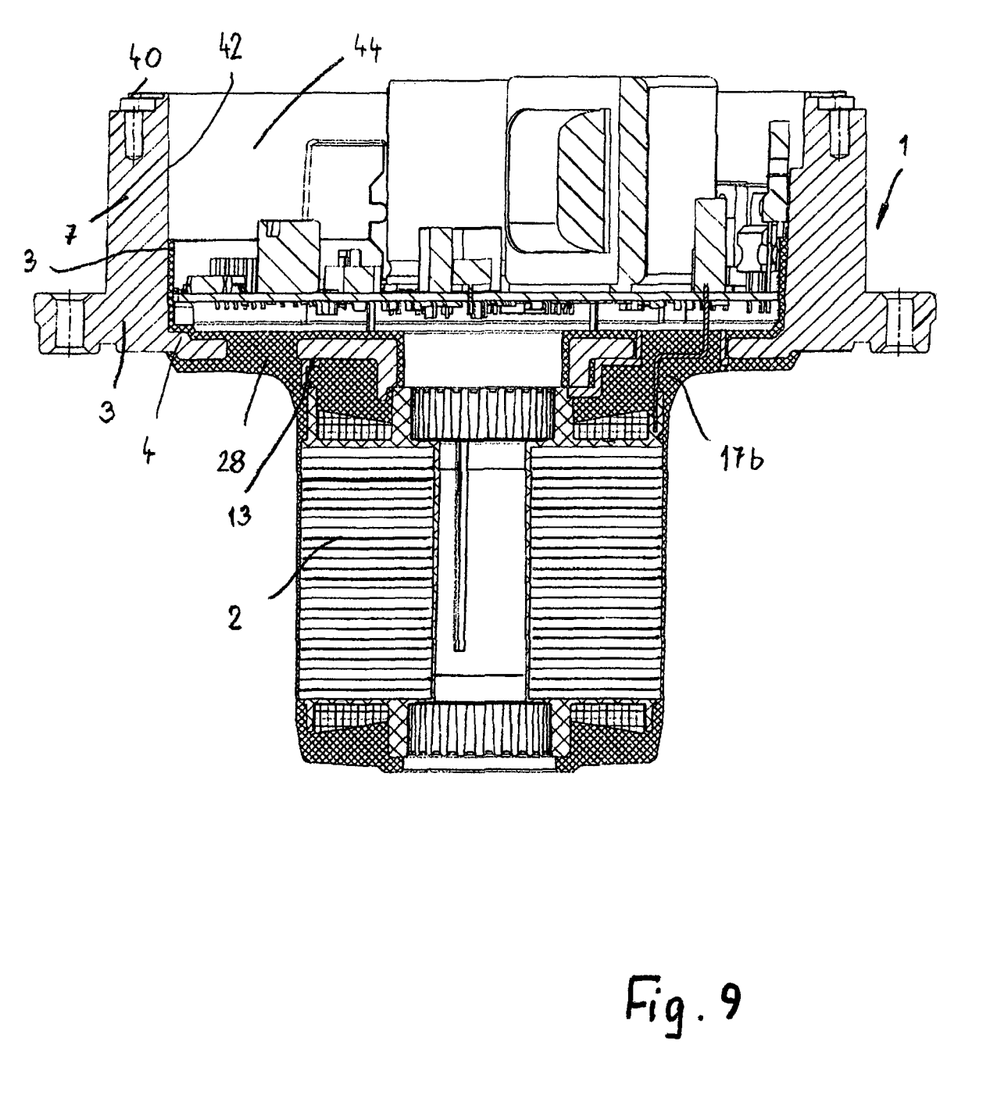
FIGS. 9 and 10 an axial section, respectively, of further embodiments of electric motors according to the invention.

The embodiment according to FIG. 9 corresponds substantially to the embodiment according to FIG. 3. FIG. 9 does not show the rotor which surrounds the stator.

The electronics housing 1 has the radially outwardly projecting circumferentially extending fastening flange 3 with which the EC motor can be fastened by the customer.

At least the jacket 7 and the fastening flange 3 are produced as one piece from metallic material, preferably from aluminum. As in the embodiment according to FIG. 3, also the bottom 4 of the electronics housing 1 is advantageously embodied as one piece together with the jacket 7.

The stator packet 2 is completely surrounded by the overmolding 17b. In contrast to the embodiment according to FIG. 3, the overmolding 17b is designed such that it covers the inner side 42 of the jacket 7 of the electronics housing across a portion of its height. The overmolding part 43 extends in an exemplary fashion across less than half the height of the inner side 42 of the housing jacket 7. Depending on the embodiment, the overmolding part 43 can also be designed higher. It is possible to cover the entire inner side 42 with the overmolding part 43.

The overmolding part 43 has only a very minimal thickness. The latter is only so large that the electrical insulation of the electrical/electronic components, located in the electronics chamber 44 of the electronics housing 1, relative to the electronics housing 1 is ensured.

In case of an appropriate material selection of the plastic material 28 with electrical insulating properties for the overmolding 17b, the intermediate insulating element 13 within the electronics housing 1 can be omitted, for example, because its insulating properties are taken over by the overmolding 17b, in particular the overmolding part 43, within the electronics housing 1.

Moreover, the overmolding part 43, even when it does not provide sufficient insulation properties, provides the advantage of ensuring distances between the electrical/electronic components in the electronic chamber 44 and the electronics housing 1. In this way, the required clearance and creepage distances can be safely observed.

In the illustrated embodiment, the overmolding part 43 extends about the circumference of the jacket 7. However, it is also possible to provide the overmolding part 43 only where an electrical insulation is required. Other regions that do not require an electrical insulation are kept free so that here, for example, components producing heat in operation can be installed in the electronics chamber 44 in such a way that they have contact with the jacket 7. Then the heat at these electrical/electronic components can be dissipated reliably directly to the jacket.

In a further embodiment, the overmolding part 43 can be pulled up so high that it projects past the free rim of the housing jacket 7. In this case, the overmolding part 43 forms a rim-side seal at the sealing surface 40 which seals the cover 33 relative to the jacket 7 of the electronics housing 1. In this case, a separate sealing element is not required.

In other respects, the embodiment according to FIG. 9 is of the same configuration as the embodiment according to FIG. 3.

Figure 10:
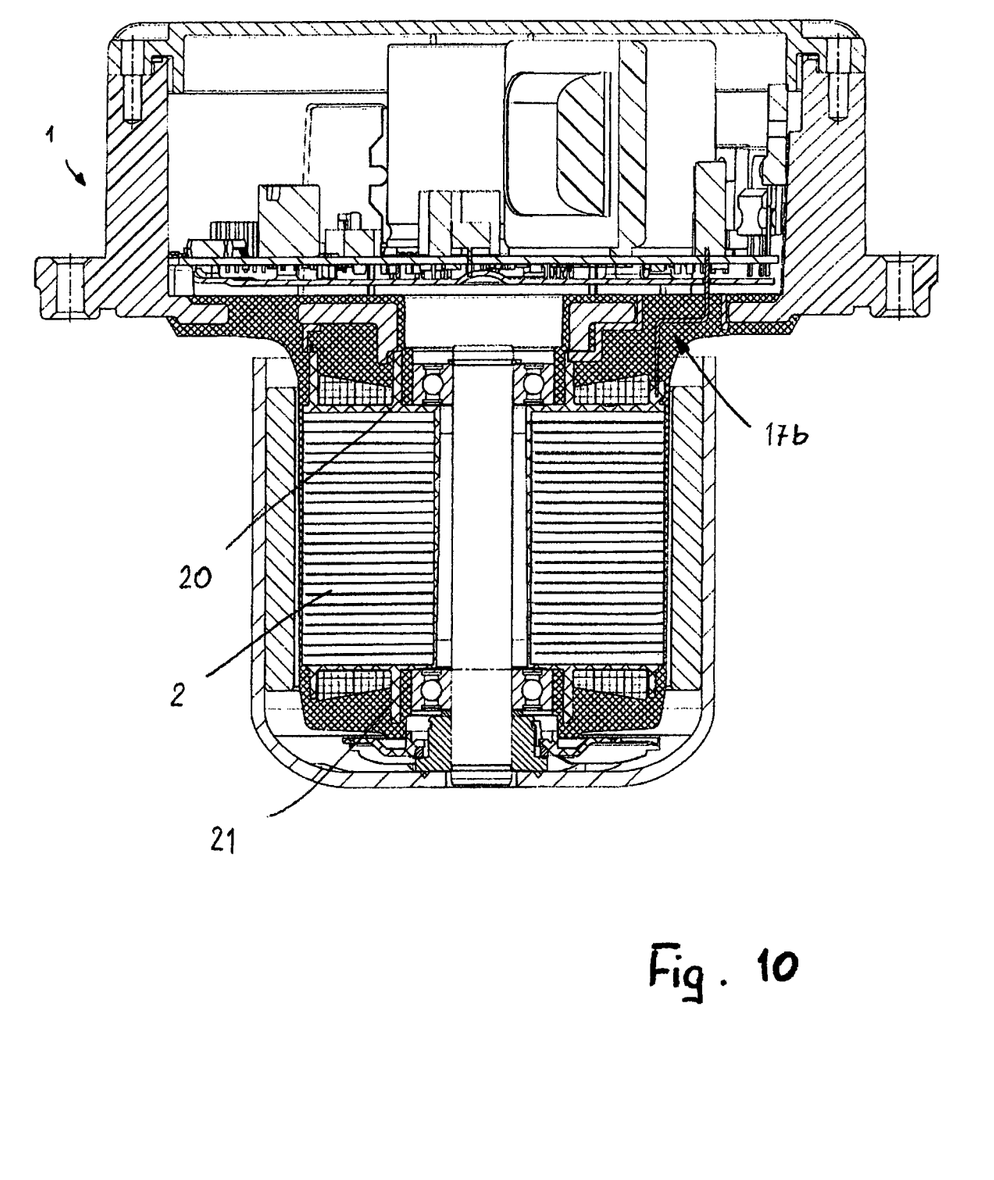

FIG. 10 shows a variant in which the two bearing seats 20, 21 are embodied in the complete overmolding 17b. For producing these bearing seats 20, 21, the stator packet 2 as well as the electronics housing 1 are placed into a tool for complete overmolding. Subsequently, the plastic material 28 for the complete overmolding 17b is injected into the tool. The plastic material 28 forms than the overmolding 17b with which the stator packet 2 and the electronics housing 1 are fixedly connected to each other. At the same time, the two bearing seats 20, 21 are produced in the overmolding tool. The overmolding tool is correspondingly configured. The overmolding tool ensures the alignment of the two bearing seats 20, 21.

When a BMC material is employed for the overmolding 17b in an advantageous manner, then it ensures a satisfactory stiffness and wear resistance of the bearing seats 20, 21.

The bearing seats 20, 21 can have a cylindrical outer shape but also a slightly corrugated outer shape.

In other respects, the embodiment is of the same configuration as the embodiment according to FIG. 3.

The described embodiment of the bearing seats 20, 21 in the overmolding 17b can also be provided in the other described embodiments.

In the described embodiments, it is possible that entire regions of the electronics housing are comprised of the overmolding 17b.

The inner and the outer overmolding 17a, 17b can be comprised of different materials. There is also the possibility to produce the inner overmolding 17a of the same material, preferably BMC, as the outer overmolding 17b.

What is claimed is:

1. An electric motor comprising:
    a stator;
    a rotor;
    an electronics and/or terminal housing comprising a bottom, wherein the bottom comprises a top side and a bottom side facing away from the top side, wherein the top side of the bottom comprises a recess, recessed relative to a circumferentially extending rim of the bottom, wherein the bottom comprises a plurality of openings arranged in the recess;
    electrical/electronic components configured to operate the electric motor, the electrical/electronic components disposed in the electronics and/or terminal housing, wherein the top side of the bottom faces the electrical/electronic components disposed in the electronics and/or terminal housing;
    an overmolding fixedly connecting the electronics and/or terminal housing and the stator to each other to form a stator unit, wherein a direct connection of the electronics and/or terminal housing and of the stator to each other is established exclusively by the overmolding without requiring additional connecting parts;
    the overmolding completely covering a bottom surface of the recess and completely covering the bottom side of the bottom of the electronics and/or terminal housing, wherein a material of the overmolding extends through the plurality of openings arranged in the recess and connects a part of the overmolding completely covering the bottom surface of the recess and a part of the overmolding completely covering the bottom side of the bottom to each other so that the overmolding connects form-lockingly the electronics and/or terminal housing and the stator to each other.

2. The electric motor according to claim 1, wherein the circumferentially extending rim adjoins a jacket of the electronics and/or terminal housing.

3. The electric motor according to claim 2, wherein a top side of the overmolding covering the bottom surface of the recess of the top side of the bottom of the electronics and/or terminal housing is positioned in a common plane with a top side of the circumferentially extending rim.

4. The electric motor according to claim 1, wherein the electronics and/or terminal housing comprises a fastening flange, wherein the fastening flange at least mostly is not covered by the overmolding.

5. The electric motor according to claim 4, wherein the fastening flange and a jacket of the electronics and/or terminal housing are embodied together as one piece.

6. The electric motor according to claim 1, wherein the bottom of the electronics and/or terminal housing and a jacket of the electronics and/or terminal housing are embodied together as one piece.

7. The electric motor according to claim 1, wherein the bottom of the electronics and/or terminal housing comprises a central opening comprising a rim, wherein a ring or a ring segment adjoins the rim and projects in a direction toward a stator packet of the stator.

8. The electric motor according to claim 7, wherein the ring or the ring segment is surrounded by an electrically insulating intermediate insulating element.

9. The electric motor according to claim 7, wherein the overmolding is configured to extend all the way to the ring or the ring segment.

10. The electric motor according to claim 7, wherein the ring or the ring segment comprises a bearing seat for a rotary bearing of a rotor shaft of the rotor.

11. The electric motor according to claim 1, wherein the overmolding covers an inner side of a jacket of the electronic and/or terminal housing at least across a portion of a circumference of the inner side of the jacket and/or at least a portion of a height of the inner side of the jacket.

12. The electric motor according to claim 1, wherein the overmolding comprises bearing seats for rotary bearings of a rotor shaft of the rotor.

13. A method for producing an electric motor according to claim 1, the method comprising:
  winding a stator packet of the stator;
  placing the stator packet of the stator together with the electronics and/or terminal housing into an injection molding tool;
  subsequently introducing a heat-conducting, electrically insulating plastic material into the injection molding tool to form the overmolding on the top side and on the bottom side of the bottom of the electronics and/or terminal housing so as to completely cover the bottom surface of the recess and completely cover the bottom side of the bottom; and
  directly connecting, without requiring additional connecting parts, the stator and the electronics and/or terminal housing fixedly and form-lockingly to each other to a stator unit exclusively by the heat-conducting, electrically insulating plastic material of the overmolding extending through the plurality of openings arranged in the recess and connecting the part of the overmolding completely covering the bottom surface of the recess and the part of the overmolding completely covering the bottom side of the bottom to each other.

14. An electric motor comprising:
  a stator;
  a rotor;
  an electronics and/or terminal housing comprising a bottom, wherein the bottom comprises a top side and a bottom side facing away from the top side, wherein the bottom comprises openings;
  electrical/electronic components configured to operate the electric motor, the electrical/electronic components disposed in the electronics and/or terminal housing;
  an overmolding fixedly connecting the electronics and/or terminal housing and the stator to each other to form a stator unit, wherein a direct connection of the electronics and/or terminal housing and of the stator to each other is established exclusively by the overmolding without requiring additional connecting parts;
  the overmolding completely covering the top side and the bottom side of the bottom of the electronics and/or terminal housing, the top side of the bottom facing the electrical/electronic components disposed in the electronics and/or terminal housing, wherein the overmolding connects form-lockingly the electronics and/or terminal housing and the stator to each other, wherein a material of the overmolding extends through the openings of the bottom and connects an overmolding part of the overmolding covering the top side of the bottom and an overmolding part of the overmolding covering the bottom side of the bottom to each other;
  wherein the overmolding continues in a direction away from the overmolding part of the overmolding covering the bottom side and encloses an exterior side of a stator packet of the stator and a lower winding overhang of the stator packet.

\* \* \* \* \*